United States Patent

[11] 3,609,081

| [72] | Inventor | Harry J. Andress, Jr.<br>Pitman, N.J. |
|---|---|---|
| [21] | Appl. No. | 867,369 |
| [22] | Filed | Oct. 17, 1969 |
| [45] | Patented | Sept. 28, 1971 |
| [73] | Assignee | Mobil Oil Corporation<br>Continuation-in-part of application Ser. No. 710,784, Mar. 6, 1968, now abandoned, which is a continuation-in-part of application Ser. No. 556,577, June 19, 1966, now abandoned, which is a continuation-in-part of application Ser. No. 510,395, Nov. 29, 1965, now abandoned. |

[54] ORGANIC COMPOSITIONS CONTAINING SECONDARY $C_6$ TO $C_9$ TRIALKYL PHENOLS, OR THEIR MIXTURES, AS ANTIOXIDANTS
10 Claims, No Drawings

[52] U.S. Cl. ........................................ 252/52, 252/404, 44/78, 260/45.95

[51] Int. Cl. ........................................ C10m 1/20
[50] Field of Search ........................................ 252/52, 404; 44/78; 260/624

[56] References Cited
UNITED STATES PATENTS

| 2,202,877 | 6/1940 | Stevens et al. | 44/78 |
|---|---|---|---|
| 2,721,804 | 10/1955 | Rosenwald | 44/78 X |
| 3,211,652 | 10/1965 | Hinkamp | 252/49.8 |
| 3,394,020 | 7/1968 | Bell et al. | 252/404 |

FOREIGN PATENTS

| 6,700,014 | 1/1967 | Netherlands |  |
|---|---|---|---|

Primary Examiner—Daniel E. Wyman
Assistant Examiner—W. Cannon
Attorneys—Andrew L. Gaboriault, Oswald G. Hayes, Raymond W. Barclay and Benjamin I. Kaufman ABSTRACT: Organic compositions are provided containing secondary $C_6$ to $C_9$ trialkyl phenols, or their mixtures, as antioxidants for preventing oxidative deterioration of metal surfaces.

ORGANIC COMPOSITIONS CONTAINING SECONDARY C₆ TO C₉ TRIALKYL PHENOLS, OR THEIR MIXTURES, AS ANTIOXIDANTS

CROSS-REFERENCE TO RELATED APPLICATIONS

Continuation-in-part of application Ser. No. 710,784, filed Mar. 6, 1968, which is a continuation-in-part of application Ser. No. 556,577, filed June 19, 1966, and which, in turn, is a continuation-in-part of application Ser. No. 510,395, filed Nov. 29, 1965 which applications are now abandoned.

BACKGROUND OF THE INVENTION

1. Field of the Invention

This invention is a continuation-in-part of application Ser. No. 710,784, filed Mar. 6, 1968, which is a continuation-in-part of application Ser. No. 556,577, filed June 19, 1966, and which, in turn, is a continuation-in-part of application Ser. No. 510,395, filed Nov. 29, 1965, and relates to improved organic compositions, and in one of its aspects relates more particularly to improved organic compositions in the form of liquid and solid hydrocarbons that are normally susceptible of causing deterioration of metal surfaces by corrosion or oxidation. Still more particularly, in this aspect, the invention relates to improved organic compositions in the form of petroleum distillate hydrocarbon fuels, lubricating oils and greases which, in their uninhibited state, tend to react with and corrode metal surfaces with which they may come into contact in the performance of their intended functions.

2. Description of the Prior Art

It is well known that certain types of organic compounds are susceptible of causing deterioration by oxidation or by corrosion when coming into contact with various metal surfaces. For example, it is known that liquid hydrocarbons in the form of fuel oils or lubricating oils tend to accumulate considerable quantities of water when maintained for long periods of time in storage vessels; and when subsequently brought into contact with metal surfaces in their functional environments, deterioration of equipment as a result of corrosion, occurs. In addition, where such lubricating oils or other corrosion-inducing materials are incorporated into solid lubricants as in the form of greases, similar deleterious results are encountered, thus clearly indicating the necessity for incorporating into such organic compositions an effective antioxidant and corrosion-inhibiting agent.

SUMMARY OF THE INVENTION

It has now been found that the aforementioned oxidative and corrosive properties of organic compositions, particularly in the form of fuels, lubricants, heat exchange fluids, automatic transmission fluids, polymers such as rubber, plastics and the like, can be effectively overcome by incorporating therein, as an antioxidant and anticorrosion agent, small amounts, sufficient to inhibit deterioration, of a secondary trialkyl phenol having from six to nine carbon atoms per alkyl group. In general, the present invention, in its preferred applications, contemplates organic compositions which are normally susceptible to causing oxidative and corrosive deterioration of metal surfaces, which contain a small amount of the aforementioned secondary trialkyl phenols sufficient to inhibit such deterioration, and usually from about 0.001 to about 10 percent, by weight, of the total weight of such compositions. When these secondary trialkyl phenols are incorporated into liquid hydrocarbon compositions, such as gasolines, jet fuels, turbine fuels and the like, or in lubricating oils, they are preferably employed in an amount from about 0.001 to about 0.01 percent, by weight, of the total weight of the composition. When the secondary trialkyl phenols are incorporated into an organic grease composition, they are preferably employed in an amount from about 0.1 to about 5 percent, by weight, of the total weight of the grease.

The organic compounds improved in accordance with the present invention may comprise any materials that are normally susceptible to deterioration by oxidation or corrosion, in the manner previously described. A field of specific applicability is the improvement of liquid hydrocarbons in accordance with the present invention, boiling from about 75° to about 1,000° F. Of particular significance is the treatment of petroleum distillate fuel oils having an initial boiling point from about 75° to about 135° F. and an end boiling point from about 250° to about 750° F. It be noted, in this respect, that the term "distillate fuel oils" is not intended to be restricted to straight-run distillate fractions. These distillate fuel oils can be straight run distillate fuel oils, catalytically or thermally cracked (including hydrocracked) distillate fuel oils, or mixtures of straight-run distillate fuel oils, naphthas and the like, with cracked distillate stocks. Moreover, such fuel oils can be treated in accordance with well-known commercial methods, such as acid or caustic treatment, hydrogenation, solvent-refining, clay treatment, and the like.

The distillate fuel oils are characterized by their relatively low viscosity, pour point and the like. The principal property which characterizes these contemplated hydrocarbons, however, is their distillation range. As hereinbefore indicated, this range will lie between about 75° and about 750° F. Obviously, the distillation range of each individual fuel oil will cover a narrower boiling range, falling, nevertheless, within the above-specified limits. Likewise, each fuel oil will boil substantially, continuously, throughout its distillation range.

Particularly contemplated among the fuel oils are Nos. 1, 2 and 3 fuel oils, used in heating and as diesel fuel oils, gasoline and jet combustion fuels, as previously indicated. The domestic fuel oils generally conform to the specifications set forth in ASTM specification D396–48T. Specifications for diesel fuels are defined in ASTM specification D975–48T. Typical jet fuels are defined in Military specification MIL-F-5624B. In addition, as previously indicated, hydrocarbon lubricating oils of varying viscosity and pour points, falling both within and outside the indicated ranges for the aforementioned fuel oils, may also be effectively treated through the use of the aforementioned trialkyl phenols, as antioxidation and anticorrosion agents.

As previously indicated, the aforementioned trialkyl phenols may also be incorporated, as anticorrosion agents, in grease compositions. Such greases, may comprise a combination of a wide variety of lubricating vehicles and thickening or gelling agents. Thus, greases in which the aforementioned trialkyl phenols are particularly effective, may comprise any of the conventional hydrocarbon oils of lubricating viscosity, as the oil vehicle, and may include mineral or synthetic lubricating oils, aliphatic phosphates, esters and diesters, silicates, siloxanes and oxalkyl ethers and esters. Mineral lubricating oils, employed as the lubricating vehicle, may be of any suitable lubricating viscosity range from about 45 S.S.U. at 100° F. to about 6,000 S.S.U. at 100° F., and, preferably, from about 50 to about 250 S.S.U. at 210° F. These oils may have viscosity indexes varying from below 0 to about 100 or higher. Viscosity indexes from about 70 to about 95 are preferred. The average molecular weights of these oils may range from about 250 to about 800. The lubricating oil is employed in the grease composition in an amount sufficient to constitute the balance of the total grease composition, after accounting for the desired quantity of the thickening agent, and other additive components to be included in the grease formulation.

As previously indicated, the oil vehicles employed in the novel grease formulations of the present invention, in which the aforementioned trialkyl phenols are incorporated as antioxidative or anticorrosion agents, may comprise mineral or synthetic oils of lubricating viscosity. When high-temperature stability is not a requirement of the finished grease, mineral oils having a viscosity of at least 40 S.S.U. at 100° F., and particularly those falling within the range from about 60 S.S.U. to about 6,000 S.S.U. at 100° F. may be employed. In instances, where synthetic vehicles are employed rather than mineral oils, or in combination therewith, as the lubricating vehicle, various compounds of this type may be successfully utilized. Typical synthetic vehicles include: polypropylene, polypropylene glycol, trimethylol propane esters, neopentyl and pentaerythritol esters, di-(2-ethyl hexyl) sebacate, di-(2-ethyl hexyl) adipate, dibutyl phthalate, fluorocarbons, silicate esters, silanes, esters of phosphorous-containing acids, liquid ureas, ferrocene derivatives, hydrogenated mineral oils, chain-type polyphenyls, siloxanes and silicones (polysiloxanes), alkyl-substituted diphenyl ethers typified by a butyl-substituted bis (p-phenoxy phenyl) ether, phenoxy phenyl ethers, etc.

The lubricating vehicles of the aforementioned improved greases of the present invention containing the above-described trialkyl phenols as additives, are combined with a grease-forming quantity of a thickening agent. For this purpose, a wide variety of materials may be employed. These thickening or gelling agents may include any of the conventional metal salts or soaps, which are dispersed in the lubricating vehicle in grease-forming quantities, in such degree as to impart to the resulting grease composition, the desired consistency. Other thickening agents that may be employed in the grease formation may comprise the nonsoap thickeners, such as surface-modified clays and silicas, aryl ureas, calcium complexes and similar materials. In general, grease thickeners may be employed which do not melt and dissolve when used at the required temperature within a particular environment; however, in all other respects, any material which is normally employed for thickening or gelling hydrocarbon fluids for forming grease can be used in preparing the aforementioned improved grease in accordance with the present invention.

The secondary trialkyl phenols of the present invention may be prepared, in general, by reacting an olefin having from six to nine carbon atoms per molecule, or mixtures of such olefins, with phenol to obtain the corresponding secondary trialkyl phenol having from six to nine carbon atoms per alkyl group. If a mixture of $C_6$ to $C_9$ olefins is reacted with phenol, there is, correspondingly, produced a mixture of secondary trialkyl phenols in which the individual secondary trialkyl phenols may possess alkyl groups having only six, or seven, or eight, or nine carbon atoms, individually or combinations of alkyl groups having from six to nine carbons atoms per alkyl group. The reaction, as more fully hereinafter discussed, is, in general, carried out at a temperature from about 75° to about 100° C., and preferably at a temperature from about 85° C. to about 95° C., to produce the secondary trialkyl phenol product. More specifically, the novel secondary trialkyl phenols of the present invention can be produced by reacting 3 moles of the $C_6$ to $C_9$ olefin with one mole of phenol, with stirring at a selected elevated temperature, for a period of time sufficient to insure complete reaction. Thereafter, to this reaction mixture is added distilled water, with stirring. The resulting reaction mixture is then water washed repeatedly until the washings are neutral to litmus paper. Topping of this mixture at increased elevated temperature and at atmospheric pressure, results in obtaining the finished secondary trialkyl phenol product, having from six to nine carbon atoms per alkyl group.

The secondary trialkyl phenols of the present invention are specifically compared with secondary $C_6$ to $C_9$ trialkyl phenols, or their mixtures, as antioxidants for organic compositions capable of causing oxidative and corrosive deterioration of metal surfaces. In this respect, as more fully hereinafter described, a marked criticality resides in the specific use of the secondary $C_6$ to $C_9$ trialkyl phenols. Thus, it has been found that where a secondary $C_5$ or lower trialkyl phenol is employed in the organic compositions, undesirable reduced induction periods, increased gum content and increased total potential residues, are obtained. On the other hand, where a secondary $C_{10}$ or higher trialkyl phenol is employed, it is found that the freeze point of the organic composition is adversely affected and formation of undesirably waxy compounds also results.

DESCRIPTION OF SPECIFIC EMBODIMENTS

The following data and examples will serve to illustrate the preparation of the aforementioned novel secondary trialkyl phenols of the present invention, and to demonstrate the effectiveness thereof in organic compositions which are normally susceptible of causing oxidative and corrosive deterioration of metal surfaces, and particularly with respect to the use of these additives in hydrocarbon fuels, lubricating oils, and the like. It will be understood, of course, that it is not intended the invention be limited to the particular compositions disclosed or to the operations or manipulations involved. Various modifications thereof, can be employed and will be readily apparent to those skilled in the art.

Example 1

A mixture of 252 grams (3 moles) if 1-hexene, 94 grams (1 mole) of phenol and 20 grams of boron trifluoride ethyletherate was stirred at a temperature of about 85°–90° C. for a period of about 6 hours. The reaction mixture was then washed with hot water until the washings were neutral to litmus. Topping at a reduced pressure produced secondary trihexyl phenol.

Example 2

A mixture of 294 grams (3 moles) of 1-heptene, 94 grams (1 mole) of phenol and 20 grams of boron trifluoride ethyletherate was stirred at a temperature of about 85°–90° C. for a period of about 6 hours. The reaction mixture was then washed with hot water until the washings were neutral to litmus. Topping at a reduced pressure produced secondary triheptyl phenyl.

Example 3

A mixture of 94 grams (1 mole) phenol, 273 grams (3 moles) of a mixture comprising approximately 50 percent 1-hexene and 50 percent 1-heptene, and 20 grams of boron trifluoride ethyletherate was stirred at a temperature of about 90° C. for a period of about 6 hours. To this reaction mixture were added about 20 grams of distilled water, with stirring. The reaction mixture was then water washed repeatedly until the washings were neutral to litmus. Topping at 210° C. and at a pressure of 760 mm. produced a mixture of secondary trialkyl phenols having from six to seven carbon atoms per alkyl group.

In order to determine the sedimentation characteristics of fuel oils in which the novel trialkyl phenols of the present invention are incorporated, the 110° F. Fuel Oil Storage Test, was employed. In this test a 500-milliliter sample of the fuel oil under test is placed in a convection oven maintained at a temperature of 110° F. for a period of 16 weeks. Thereafter, the sample is removed from the oven and cooled. The cooled sample is filtered through a tarred asbestos filter (Gooch crucible) to remove insoluble matter. The weight of such matter in milligrams is reported as the amount of sediment. A sample of the base uninhibited oil is run along with a fuel oil blend under test. The effectiveness of a fuel oil containing an inhibitor is determined by comparing the weight of sediment formed in the inhibited oil with that formed in the uninhibited oil.

Accordingly, the novel secondary trialkyl phenols of examples 1, 2 and 3, were individually incorporated in a gasoline blend comprising 100 percent catalytically cracked component, and boiling within the range from approximately 100° to approximately 400° F., and containing 3 cc. of tetraethyl lead, and 1 pound per 1,000 barrels of a metal deactivator comprising the disalicylaldimine of 1,2-propane diamine. The test results, comparing the uninhibited fuel and the blended fuel containing the novel secondary trialkyl phenols of the present invention, are set forth in the following table 1.

TABLE I

| Compound | Conc. lbs/ 1,000 bbls. | Gum Formation mg/100 ml. |
|---|---|---|
| Base fuel | 0 | 15.4 |
| Base fuel + Example 1 | 5 | 11.3 |

Table I—Continued

| Base fuel + Example 1 | 10 | 10.0 |
|---|---|---|
| Base fuel + Example 2 | 5 | 10.5 |
| Base fuel + Example 2 | 10 | 10.5 |
| Base fuel + Example 3 | 5 | 12.1 |
| Base fuel + Example 3 | 10 | 11.2 |

It will be seen from the above table I that a marked decrease in ASTM gum content is observed with respect to the aforementioned fuel blend containing either the secondary trihexyl phenol or the secondary triheptyl phenol, or mixtures of trisecondary hexyl and trisecondary heptyl phenols, of the present invention, as compared with the same fuel blend which did not contain the aforementioned additives.

The use of tertiary trialkyl phenols has heretofore been suggested, in organic compositions, for example, the use of tertiary trihexyl phenol in liquid hydrocarbon fuels. In order to demonstrate, therefore, the superiority of the secondary trihexyl and triheptyl phenols of the present invention, in antioxidant properties, a comparison was made of the secondary trialkyl phenols of the present invention and the tertiary trialkyl phenols of the prior art. For such purpose, tertiary trihexyl phenol was first synthesized by reacting 3 moles of 2-methyl 1-pentene with 1 mole of phenol in the presence of a boron trifluoride catalyst. The tertiary trihexyl phenol thus produced and a mixture of secondary trialkyl phenols having from six to seven carbon atoms per alkyl group (as obtained in accordance with the disclosure of example 3) were individually blended in each instance in the same gasoline, comprising 100 percent catalytically cracked components and containing 3 cc. per gallon of tetraethyl lead. The data and the respective comparative results obtained are shown in the following table II.

TABLE II

| Compound | Conc., lbs./1,000 bbls. | Gum formation, mg./100 ml. |
|---|---|---|
| Base fuel | 0 | 29.4 |
| Base fuel plus tertiary trihexyl phenol | 2.5 | 26.6 |
| Base fuel plus secondary trihexyl and secondary triheptyl phenol of Example 3 | 2.5 | 23.7 |

As is apparent from the data in the foregoing table II, the secondary trihexyl and triheptyl phenols of the present invention are far more effective in reducing gum formation of fuels than the tertiary trihexyl phenol of the prior art. Thus, it will be seen, for example, that gasolines containing the aforementioned secondary trialkyl phenols of the present invention, when compared with the same gasoline containing the tertiary trialkyl phenols of the prior art, represent an improvement of 12.2 percent, insofar as reduction of gum formation is concerned.

In order to demonstrate the aforementioned criticality residing in the specific use of the secondary $C_6$ to $C_9$ trialkyl phenols as antioxidants in organic compositions in accordance with the present invention, the following comparative data were obtained:

Example 4

A mixture of 47 grams (0.5 mole) phenol, 105 grams (1.5 moles) of 1-pentene and 30 grams of boron trifluoride ethyletherate was stirred at a temperature of about 80°–90° C. for a period of about 5 hours. The reaction mixture was then washed with hot water until the washings were neutral to litmus. Topping at 150° C. under reduced pressure produced secondary tripentyl phenol.

A comparison with respect to oxidation stability, existent gum and potential residue was made between the secondary tripentyl phenol of example 4 and a commercially available mixture of secondary tri($C_6$–$C_9$)alkyl phenols comprising, approximately, by weight, 34–40 percent 1-hexene, 20–25 percent 1-heptene, 16–20 percent 1-octene, and 16–20 percent 1-nonene. The aforementioned comparisons were made according to standard ASTM methods and the resulting data obtained are shown in the following tables III, IV and V. The base fuel employed was the same as employed in accordance with the above disclosed tables I and II.

TABLE III

Oxidation stability of gasoline induction period method A.S.T.M. Test D 525

| Compound | Conc., lbs./1,000 bbls. | Induction period seconds |
|---|---|---|
| Base fuel | 0 | 804 |
| Base fuel plus secondary tripentyl phenol | 10 | 839 |
| Base fuel plus secondary tri-($C_6$–$C_9$) alkyl phenols | 10 | 918 |

TABLE IV

Existent gum in fuels by jet evaporation A.S.T.M. Test D 381-61T

| Compound | Conc., lbs./1,000 bbls. | Total gum, mg./100 ml. | Heptane washed gum, mg./100 ml. |
|---|---|---|---|
| Base fuel | 0 | 4.0 | 1.0 |
| Base fuel plus secondary tripentyl phenol | 10 | 4.0 | 1.0 |
| Base fuel plus secondary tri-($C_6$–$C_9$)alkyl phenols | 10 | 3.6 | 0.2 |

TABLE V

Oxidation stability of aviation fuels potential residue method A.S.T.M Test D 873-62

| Compound | Conc., lbs./1,000 bbls. | Total potential residue, mg./100 ml. |
|---|---|---|
| Base fuel | 0 | 260 |
| Base fuel plus secondary tripentyl phenol | 10 | 182 |
| Base fuel plus secondary tri-($C_6$–$C_9$) alkyl phenols | 10 | 137 |

As will be seen from the aforementioned table III a marked improvement in induction period, under the conditions of the oxidative stability test of ASTM Test D 525 was achieved, in that the secondary tri($C_6$–$C_9$)alkyl phenols revealed a markedly increased induction period over the base fuel as well as over the secondary tripentyl phenol. It will also be seen from table IV that a marked decrease in existent gum, as revealed by ASTM Test D 381–61T, was achieved in that the secondary tri($C_6$–$C_9$)alkyl phenols of the present invention showed a markedly reduced gum content over both the base fuel and also the tri secondary pentyl phenol. Finally, it will also be apparent that, according to table V, the potential residue of the secondary tri($C_6$–$C_9$)alkyl phenols of the present invention was markedly reduced as compared with the aforementioned base fuel as well as the tri secondary pentyl phenol.

It will thus be apparent that the secondary $C_6$ to $C_9$ trialkyl phenols of the present invention are markedly effective as antioxidants for the prevention of oxidative deterioration of metal surfaces by organic compositions, and are particularly effective in inhibiting clogging and deterioration of such hydrocarbons as petroleum distillate fuels. It should also be noted that while the secondary trialkyl phenols of the present invention will effectively stabilize such organic compositions, other additive agents may also be present, such as lead, antiknock compounds, copper and other metal deactivators, antirust agents, carburetor detergents, anti-icing agents and various forms of deposit modifiers.

I claim:

1. A composition selected from the group consisting of fuels, lubricating oils and greases normally capable of undergoing oxidative deterioration and present in major proportion, containing a small amount, sufficient to inhibit said deterioration, of a mixture of secondary trialkyl phenols having from six to nine carbon atoms inclusive per alkyl group.

2. A composition in accordance with claim 1 wherein said mixture of trialkyl phenols is present in an amount from about 0.001 to about 10 percent, by weight, of the total of said composition.

3. A composition in accordance with claim 1 wherein said mixture of trialkyl phenols is present in an amount from about 0.001 to about 0.01 percent, by weight, of the total of said composition.

4. A composition in accordance with claim 1 wherein said mixture of trialkyl phenols is present in an amount from about 0.1 to about 5 percent, by weight, of the total of said composition.

5. A composition in accordance with claim 1 wherein said composition is a liquid hydrocarbon comprising a petroleum distillate fuel oil having an initial boiling point from about 75° to about 135° F. and an end boiling point from about 250° to about 750° F.

6. A composition in accordance with claim 1 wherein said composition comprises a lubricant.

7. A composition in accordance with claim 1 wherein said composition comprises a grease.

8. The composition of claim 5 wherein said liquid hydrocarbon comprises a gasoline.

9. The composition of claim 5 wherein said liquid hydrocarbon comprises a jet fuel.

10. The composition of claim 5 wherein said liquid hydrocarbon comprises a turbine fuel.